United States Patent
Aluvala et al.

(10) Patent No.: US 10,587,583 B2
(45) Date of Patent: Mar. 10, 2020

(54) PRIORITIZING APPLICATION TRAFFIC THROUGH NETWORK TUNNELS

(71) Applicant: VMWARE, INC., Palo Alto, CA (US)

(72) Inventors: Suman Aluvala, Bangalore (IN); Ramani Panchapakesan, Bangalore (IN); Niranjan Paramashivaiah, Bangalore (IN); Mahesh Kavatage, Bangalore (IN); Pavan Rajkumar Rangain, Bangalore (IN)

(73) Assignee: VMWARE, INC., Palo Alto, CA (US)

(*) Notice: Subject to any disclaimer, the term of this patent is extended or adjusted under 35 U.S.C. 154(b) by 239 days.

(21) Appl. No.: 15/641,354

(22) Filed: Jul. 5, 2017

(65) Prior Publication Data
US 2018/0337887 A1 Nov. 22, 2018

(30) Foreign Application Priority Data

May 19, 2017 (IN) .............................. 201741017660

(51) Int. Cl.
| | |
|---|---|
| H04L 29/06 | (2006.01) |
| H04L 12/46 | (2006.01) |
| H04L 12/66 | (2006.01) |
| H04L 12/851 | (2013.01) |
| H04L 12/911 | (2013.01) |
| H04L 12/859 | (2013.01) |
| H04L 29/08 | (2006.01) |

(52) U.S. Cl.
CPC ........ *H04L 63/029* (2013.01); *H04L 12/4633* (2013.01); *H04L 12/66* (2013.01); *H04L 47/24* (2013.01); *H04L 47/245* (2013.01); *H04L 47/2433* (2013.01); *H04L 47/2475* (2013.01); *H04L 47/825* (2013.01); *H04L 63/0272* (2013.01); *H04L 63/0281* (2013.01); *H04L 63/166* (2013.01); *H04L 67/322* (2013.01); *H04L 12/4641* (2013.01)

(58) Field of Classification Search
CPC ...................................... H04L 63/029
See application file for complete search history.

(56) References Cited

U.S. PATENT DOCUMENTS

| | | | |
|---|---|---|---|
| 2013/0322255 A1* | 12/2013 | Dillon ..................... | H04L 47/22 370/236 |
| 2016/0080502 A1* | 3/2016 | Yadav .................... | G06F 16/285 709/227 |
| 2017/0155590 A1* | 6/2017 | Dillon ................. | H04L 43/0888 |

* cited by examiner

*Primary Examiner* — Simon P Kanaan
(74) *Attorney, Agent, or Firm* — Thomas | Horstemeyer, LLP (57) ABSTRACT

Disclosed are various examples for prioritizing application traffic through network tunnels between a client device and a tunnel endpoint. Network traffic is received from each of a plurality of applications executed by the client device. It is determined that the network traffic of a first application of the plurality of applications is associated with a lower priority than the network traffic of a second application of the plurality of applications. A bandwidth allocation to the network traffic of the first application is limited in the encrypted tunnel as compared to a bandwidth allocation to the network traffic of the second application in the encrypted tunnel according to the lower priority. The network traffic of each of the plurality of applications is forwarded through the encrypted tunnel to the tunnel endpoint.

20 Claims, 5 Drawing Sheets

PRIORITIZING APPLICATION TRAFFIC THROUGH NETWORK TUNNELS

RELATED APPLICATIONS

Benefit is claimed under 35 U.S.C. 119(a)-(d) to Foreign Application Serial No. 201741017660 filed in India entitled "PRIORITIZING APPLICATION TRAFFIC THROUGH NETWORK TUNNELS", on May 19, 2017, by VM ware, Inc., which is herein incorporated in its entirely by reference for all purposes.

BACKGROUND

For security purposes, a mobile device can be configured to route application network traffic through an encrypted network tunnel, such as a virtual private network (VPN). This configuration, is especially useful when the mobile device is connected to the Internet through an open Wi-Fi access point, where any device can eavesdrop on the network traffic. This configuration is also useful in situations where the mobile device is connected to a secured network to which untrusted dev ices can be connected, or if the operator of the network (or intermediate networks) cannot be trusted. Also, the use of a VPN can be necessary to connect to resources hosted on an organization's private network or intranet.

Different applications can have different requirements for bandwidth or quality of service (QoS) for network access. For example, applications that involve real-time voice or video content can require a higher QoS level than applications performing a bulk data transfer. A video telephony application experiencing a temporary network delay can have dropouts in video or audio that can interrupt the flow of a conversation and perceivably diminish the user experience. However, an application performing a bulk data transfer will likely not be set back by the temporary network delay and can recover by way of increased bandwidth later.

Although network operators can sometimes set QoS levels or priorities for different types of traffic on their networks, such QoS levels or priorities do not affect tunneled application traffic. To the network operator the tunneled traffic appears identical since it is encrypted. For instance, video network traffic and bulk data network traffic that is tunneled can appear to the network operator as indistinguishable socket secure (SOCKS) traffic. Moreover, control of prioritization rests with the network operator, not the mobile device owner or the organization that manages the mobile device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to assigning priorities in network tunnels to network traffic generated by different applications. Network, communications generated by applications of a mobile device can be rooted through one or more encrypted network tunnels over the public Internet to a single endpoint on an organization's network. This can provide the applications with access to protected resources on the organization's private network as well as provide security for transit over untrusted networks. However, the available bandwidth between the mobile device and the endpoint on the organization's network can vary. If two applications are transferring data over the tunnel and the bandwidth becomes constrained, each of the applications can experience a pro rata diminishing of bandwidth. Such a situation is problematic if one of the two applications requires real-time data transfer (for example, multimedia communications applications using video and/or voice), and the bandwidth necessary for a good user experience is allocated under the pro rata distribution to the other one of the two applications, which does not immediately require the bandwidth (for example, a bulk data transfer application). As will be discussed, various examples of the present disclosure introduce approaches for assigning relative priorities to application traffic within network tunnels such that the application requiring real-time data transfer can be prioritized over the bulk data transfer application.

Figure 1:
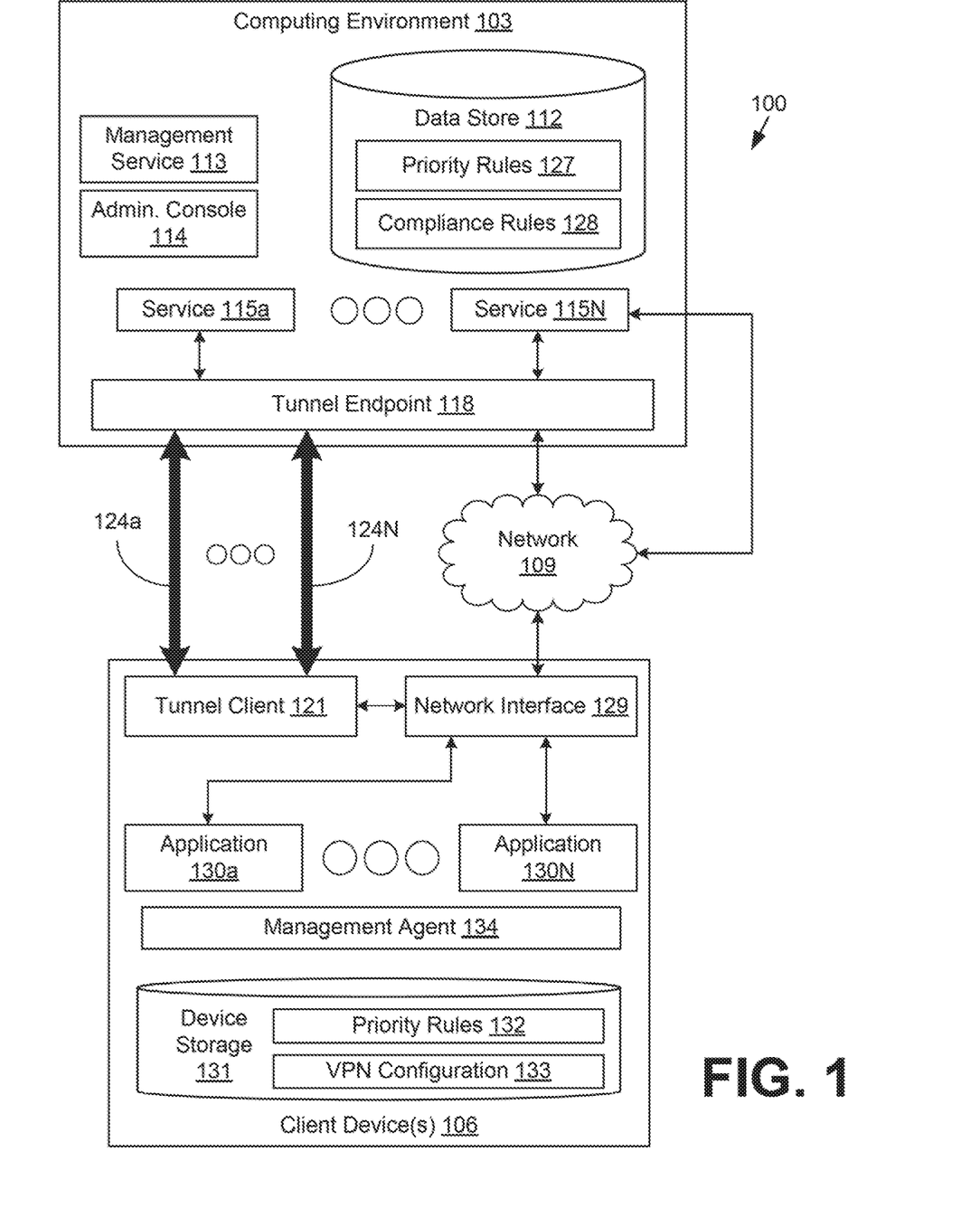
FIG. 1 is a drawing of a networked environment according to various examples of the disclosure.

With reference to FIG. 1, shown is a networked environment 100 according to various examples. The networked environment 100 includes a computing environment 103 and one or more client devices 106 in communication by way of the network 109. The network 109 can include, for example, wide area networks (WANs), local area networks (LANs), wired networks, wireless networks, other suitable networks, or any combination of two or more networks. For example the network 109 can include satellite networks, cable networks, Ethernet networks, and other types of networks.

The computing environment 103 can be a computing environment that is operated by an enterprise, such as a business or other organization. The computing environment 103 can include, for example, a server computer, a network device, or any other system providing computing capabilities. Alternatively, the computing environment 103 can employ multiple computing devices that can be arranged, for example, in one or more server banks, computer banks, or other arrangements. The computing devices can be located in a single installation or can be distributed, among many different geographical locations. For example, the computing environment 103 can include multiple computing devices that together form a hosted computing resource, a grid computing resource, or any other distributed computing arrangement.

In some cases, the computing environment 103 can operate as at least a portion of an elastic computing resource where the allotted capacity of processing, network, storage, or other computing-related resources can vary over time. The computing environment 103 can also include or be operated as one or more virtualized computer instances. Generally, the computing environment 103 can be operated in accordance with particular security protocols such that it is considered a trusted, computing environment. The computing environment 103 can be located remotely with respect to the client device 106.

Various applications and/or other functionality may be executed in the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a management service 113 to oversee management of the client devices 106, an administrative console 514, a plurality of services 115a . . . 115N, a tunnel endpoint 118, and other applications, services, processes, systems, engines, or functionality not discussed in detail herein. The services 115 represent one or more servers pro viding a variety of services to client applications executed on the client devices 106. The services 115 can pertain to entail, web servers, file storage and transfer, video and voice telephony, social networking, business sales and contact management, inventory management, task tracking, and so on.

The management service 113 can provide functionality using application program interfaces (APIs), such as a Representational State Transfer (REST) API or an Identity Services Engine (ISE) API. The management service 113 can oversee the operation of client devices 106 enrolled with the management service 113 as well as manage enrollment and un-enrollment operations of the client devices 106. To this end, an API of the management, service 113 can provide enrollment information regarding a client device 106, including data that indicates whether the client device 106 is enrolled with the management service 113. APIs or API calls can be provided for other functionalities of the management service as discussed herein.

The management service 113 can store an enterprise platform status or flag. The enterprise platform status can indicate whether the client device 106 is an enterprise platform device that supports or is compatible with the enterprise platform or an enterprise platform feature of the enterprise platform. For example, the client device 106 can include an operating system or an application that is part of an enterprise platform. The operating system or the application of the client device 106 can be compatible with enterprise platform features like multilayered protection, application-level security, separation of enterprise data from personal data, and various enterprise platform applications.

The management system 106 can execute a user interface such as an administrative console 114 through an application; web application, and/or network site for administration of the management service 113. The administrative console 114 can also provide for administration of tunneling of network traffic or priority rules to be used in tunneling network traffic. The administrative console 114 can be considered part of the management service 113. The management service 113 can include a user interface of the console that facilitates input or upload of a certificate or another electronic credential to the management service 113.

The user interface of the console of the management service 113 can include an interlace element that can, when activated, initiate configuration of the client devices 106. In some cases, the console can be accessed through a network site and a web application. The network site or web application can generate the user interface to be rendered on a device through a browser or another application. The device can include a computer, mobile device, smartphone, or like device. An enterprise, such as one or more companies, organizations, or individuals can operate the management service 113 to oversee or manage the operation of the client devices 106 of its employees, contractors, customers, students, or other users having accounts with the enterprise. An enterprise can be a customer of the management service 113.

An enterprise can utilize the management service 113 to oversee or manage the operation of the client devices 106 of its employees, contractors, customers, students, or other users having user accounts with the enterprise. The management service 113 can remotely configure the client device 106 by interacting with an agent application, a management agent 134, or another client application executed on the client device 106.

The management service 113 can transmit various software components to the client device 106, which are then installed or configured by the management agent 134. Software components can include, for example, additional cheat applications, resources, libraries, drivers, device configurations, or other similar components that require installation on the client device 106 as specified by an administrator of the management service 113. The management service 113 can further cause policies to be implemented on a client device 106. Policies can include, for example, restrictions or permissions pertaining to capabilities of a client device 106. For instance, policies can require certain hardware or software functions of the client device 106 to be enabled or be disabled during a certain time period or when the client device 106 is physically located at a particular location. Policies can be implemented by the management agent 134.

The management service 113 can have a command queue storing at least one action to perform on the particular client device 106 upon check-in of the client device 106. For instance, the management agent 134 can cause the client device 106 to check-in with the management service, identify an action in the command queue, and perform the action. An action can be the installation of a profile, or the execution of a command or other actions to install software components or implement policies. A profile can include a set of attributes, features, services, configurations, and settings that are associated with a device and/or a user. In some cases, the management agent 134 can cause a check-in of the client device 106 periodically, on a schedule, or upon an event such as entering a physical location, changing a state of the client device 106, or installing an application on the client device 106. In one example, the contents of the command queue can include a command that the management agent 134 causes to be executed on the client device 106. In another example, the contents of the command queue can include a resource or a client application that the management agent 134 causes to be installed on the client device 106, winch the client device 106 may access through a specified uniform resource identifier (URI) or a uniform resource locator (URL).

Also, the management service 113 can request that the client device 106 check-in using a notification service like APPLE® Push Notification Service (APNS), GOOGLE® Cloud Messaging (GCM), or WINDOWS® Push Notification Services (WNS). For example, the management service 113 can transmit a request to the notification-service requesting that the client device 106 check-in. The notification service can push or otherwise route a notification to the client device 106. Once the notification is received, the management agent 134 can cause the client device 106 to check-in with the management service 113. As described above, the management agent 134 can determine whether a command queue provided by the management service 113 for the respective client device 106 contains any commands or resources for the client device 106, and, if so, can cause the commands or resources to be downloaded and/or implemented on the client device 106.

The tunnel endpoint 118 can communicate with a tunnel client 121 on the client device 106 over the network 109 by way of tunnels 124a ... 124N. In some examples of a tunnel client 121, all network traffic is routed through a server process and determines a termination point on the network 109 for the network traffic. In other examples of a tunnel client 121, the tunnel client 121 employs split routing, where traffic that is destined for a network address on an external network is sent to the termination point on the network 109 and traffic destined for an internal network on a private network is sent to the tunnel endpoint 118, which routes traffic to an internal network destination. As will be described, both the tunnel endpoint 118 and the tunnel client 121 can be configured to implement prioritization of certain types of network traffic for transit through the tunnels 124.

In some examples, a plurality of tunnel endpoints 118 can be used to provide prioritization. For example, a single tunnel client 121 can route lower priority network traffic to a first tunnel endpoint 118 and higher priori ty network traffic to a second tunnel endpoint 118.

The data stored in the data store 112 includes, for example, priority rules 127, compliance rules 128, among other data. The priority rules 127 can configure how the tunnel endpoint 118 can process different types of network traffic into microsegments with different priorities. For example, the priority rules 127 can establish different priorities for network traffic segments associated with different client applications, different categories of client, applications, different network protocols, whether the traffic is associated with a client application that is in a background state or a foreground state, different destinations such as domains or services 115, and so on.

Compliance rules 128 can include, for example, configurable criteria that must be satisfied for an enrolled one of the client, devices 106 to be "in compliance" with the management service 113. The compliance rules can be based on a number of factors including geographical location of the client device 106, activation status, enrollment status, authentication data including authentication data obtained by a device registration system, time, and date, and network properties, among other factors. The compliance rules can also be determined based on a user profile associated with a user. The user profile can be identified by obtaining authentication data associated with the client device 106. The user profile can be associated with compliance rules that are further determined based on time, date, geographical location and network properties detected by the client device 106. The user profile can further be associated with an organization group, and compliance rules can be determined in view of the organization group.

Compliance rules 128 can include predefined constraints that must be met in order for the management service 113, or other applications, to permit access so the enterprise data or other features of the client device 106. In some examples, the management service 113 communicates with a management application, a migration application, or another client application executable on the client device 106 to determine whether states exist on the client device 106 that do not satisfy one or more compliance rules 128. Some of these states can include, for example, a virus or malware being detected on the client device 106; installation or execution of a blacklisted client application; a client device 106 being "rooted" or "jailbroken," where root access is provided to a user of the client device 106. Additional states can include the presence of particular tiles, questionable device configurations, vulnerable versions of client applications, or other vulnerability, as can be appreciated. In some examples, the compliance rules 128 can be configured in the management service 113 as specified by an administrator through a user interface of the management service 113.

The client device 106 is representative of a plurality of client devices 106 that may be coupled to the network 109. The client device 106 can comprise, for example, a processor-based system such as a computer system. Such a computer system may be embodied in the form of a desktop computers; a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 106 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices.

The client device 106 has an operating system, such as WINDOWS, IOS, or ANDROID, and has a network interface 129 in order to communicate with the network 109. The client device 106 is configured to execute a plurality of different applications 130a ... 130N. The applications 130 can include email applications, text message applications, video and voice communication applications, business productivity applications, file transfer applications, and so on. The applications 130 communicate with respective services 115 to perform their corresponding functionality, which can include, for example, downloading a web page, downloading an email, sending an email, sending a video stream, receiving a voice stream, downloading bulk data, uploading bulk data, and so forth.

The tunnel client 121 is executed to provide point-to-point tunneling of network traffic between the client device 106 and the tunnel endpoint 118. Network traffic originating from the application 130 can be routed from the network interface 129 to the tunnel client 121 rather than directly to the network 109. The tunnel client 121 can secure the traffic by applying a security layer, such as encryption layer, to the traffic. In other words, the tunnel client 121 can wrap the traffic with an encryption layer. The operating system of the client device 106, in some examples, can also allow virtual private network (VPN) capabilities to be bound to one or more applications 130. In other words, the tunnel client 121 can provide per-app VPN capabilities where some or all network traffic originating from an application 130 is routed through the tunnel client 121. In some examples, traffic routed through the runnel client 149 can be secured using a device certificate generated or obtained by a management service. Such a device certificate can be installed on the client device 106 by a device management system upon receiving the device certificate from the management service.

The client device 106 has a device storage 131 with various data, including application data, operating system data, priority rules 132, VPN configurations 133, and other data. The priority rules 132 can configure how the tunnel client 121 can prioritize different types of network traffic with different priorities. For example, similar to the priority rules 127, the priority rules 132 can establish different priorities for microsegments of network traffic associated with different client applications, different categories of client applications, different network protocols, whether the traffic is associated with a client application that is in a background state or a foreground state, different destinations such as domains or services 115, and so on.

A separate VPN configuration 133 can be used for each application 130 installed on the client device 106. For example, an enterprise may prefer that network traffic sent and received from particular application 130 be routed through the tunnel client 121 according to a particular VPN configuration 133. The VPN configuration 133 can also specify what device identifying information is embedded into packets that are routed through the tunnel client 121. For example, the VPN configuration 133 can specify that transport layer security (TLS) should be employed to secure traffic from a particular application 130 and that device identifying parameters, such as a network address of the client device 106, a geolocation of the client dev ice 106, a timestamp, an identity of the application 130, a device identifier of the client device 106, an operating system version, user-identifying information such as a user identifier, or other device identifying parameters that can be extracted from the operating system or a device management system.

The VPN configuration 133 can include a list of settings for a VPN connection to be used by the tunnel client 121 to connect to a corresponding VPN. For example, the VPN configuration 133 can include a username, a password, a digital certificate, an address of a VPN server, such as the tunnel endpoint 118, a communications protocol (for example, PPP, IPsec, a secure sockets layer (SSL) or TLS-based VPN protocol, or some other VPN protocol) for the VPN connection. In some instances, the VPN configuration 133 can also specify values for various settings of the tunnel client 121. For example, the VPN configuration 133 can specify which Domain Name System (DNS) servers to use with the tunnel client 121, which Internet protocol (IP) address or addresses to assign to or associate with the tunnel client 121, the subnet mask of the tunnel client 121, the media access control (MAC) address to assign to or associate with the tunnel client 121, and potentially other settings for the tunnel client 121. These various settings can be considered device identification parameters that are embedded within the security layer.

The VPN configuration 133 can be obtained by a device management system from a management service and installed as a profile on the client device 106. In one example, the management service can initiate installation of a particular application 130 and generate a VPN configuration 133 that can be transmitted to and installed by the management system on the client device 106. The VPN configuration 133 can be specifically generated by the installation of the application 130. The VPN configuration 133 can cause the operating system of client device 106 to route some or all network traffic originating from the application 130 through a VPN connection that is established by the tunnel client 121.

Figure 2:
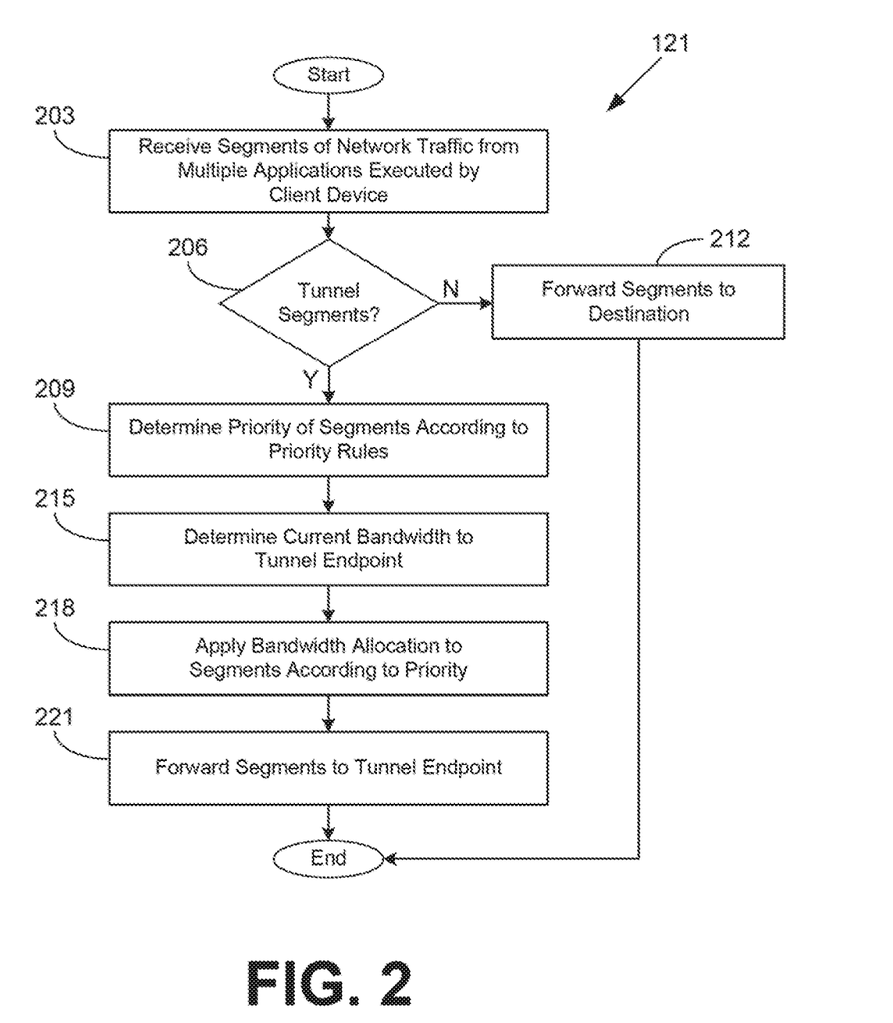
FIGS. 2-4 are flowcharts illustrating examples of functionality according to various examples of the present disclosure.

Turning now to FIG. 2, shown is a flowchart that provides one example of the operation of the tunnel client 121. Functionality attributed to the tunnel, client 121 can be implemented in a single process or application or in multiple processes or applications. The separation or segmentation of functionality as discussed herein is presented for illustrative purposes only.

At step 203, the tunnel client 121 can receive segments of network traffic from a plurality of different applications 130 executed by the client device 106. The network traffic is destined for one or more services 115. For instance, a first application 130 can be performing a bulk data transfer, while a second application 130 can be transmitting a real-time video and audio stream. Each application 130 can be associated with multiple transmission control protocol (TCP) or user datagram protocol (UDP) streams, which can be referred to as sessions, At step 206, the tunnel client 121 can determine whether to tunnel the individual segments of network traffic to the tunnel endpoint 118 or to forward the network traffic directly to its destination (for example, a service 115) by way of a default gateway on the network 109. As specified in the VPN configuration 133, some applications 130 can be set up to use a per-app VPN, while other applications 130 can be configured not to use a VPN. If the tunnel client 121 determines that the particular network traffic is to be tunneled, the tunnel client 121 can proceed to step 209. If the tunnel client 121 determines that the particular network traffic segment is not to be tunneled, the tunnel client 121 can proceed to step 212, as will be discussed later.

At step 209, the tunnel client 121 can determine the respective priorities of the network traffic segments according to the priority rules 132 configured on the client device 106. The priorities can be high, medium, and low, on a scale of one to ten, or assigned according to another type of granularity. The priorities can depend on one or more of a variety of factors. In various situations, a priority can be assigned according to a single factor, or a weighted combination of multiple factors can be used. Examples of priority factors that can be used in priority rules 132 will next be discussed.

To begin, segments of network traffic from different applications 130 can have different priorities. For instance, network traffic from a video conferencing application 130 can always be given a higher priority than network traffic from a web browser application 130, and the priority can be assigned to the traffic based on an identification of the application 330 that originated it. Priorities can be assigned based on the specific application 130 or a category to which it belongs (for example, productivity applications 130 or communication applications 130). In some cases, category information can be obtained from an app store or other repository. If an application programming interface (API) for obtaining category information is not available, the category can be determined by parsing one or more hypertext markup language (HTML) pages for the application 130 or a category.

In other examples, priorities can be determined based on destinations. For instance, different services 115, domain names, IP address ranges, or destinations to which network traffic is directed can be given different priorities. To illustrate, network traffic to a domain associated with video telephony traffic can be prioritized greater than network traffic to an unspecified domain or to a domain associated with backup data transfer.

In other examples, priorities can be determined based on the network protocol used. Since the tunnel client 121 will have access to the packet, the tunnel client 121 can inspect the payload of the packet to ascertain the protocol. Examples of network protocols can include hypertext transfer protocol (HTTP), real-time transport protocol (RTF), H.264 video streams, file transfer protocol (FTP), and so on. For instance, network traffic involving H.264 video streams can be given a higher priority relative to network traffic involving FTP file downloads. In addition to network protocol being a factor, the type of message can also weigh in determining priority. For example, a file download can be prioritized differently depending on whether it occurs in a browser or in an email application.

Priorities for network traffic can also be assigned based on whether the application 130 is currently in the background or in the foreground. For example, network traffic for a background application 130 can be given a lower priority than network traffic for a foreground application 130 in order to provide for a smooth user experience.

At step 215, the tunnel client 121 determines the current bandwidth available from the client device 106 to the tunnel endpoint 18. For instance, the tunnel client 121 can track the total amount of data sent within a certain time period such as 100 milliseconds or another time period. The total amount of data can be constrained by the network 109 such that the applications 130 will back off sending data when data segments are lost or not acknowledged.

At step 218, the tunnel client 121 applies a bandwidth allocation to the segments of the network traffic of each application 130 according to the determined priorities. This can have the effect of limiting the bandwidth allocation to network traffic of a first application 130 that is associated with a lower priority than the network traffic of a second application 130. In some cases, the bandwidth of certain network traffic can be unlimited (save for network 109 constraints) due to a high priority. Thus, the high priority network traffic will be given relatively more bandwidth such that packets can be processed and sent to the tunnel endpoint 118 with less latency. In some examples, a priority queue can be used to achieve prioritization. An example of a priority queue will be discussed with respect to FIG. 3. In other examples, thread yielding can be used for prioritization. For example, if packets are sent by a lower priority application 130, after processing an atomic operation, the current process or thread can yield for processing the next higher priority packet.

At step 221, the tunnel client 121 forwards the segments of network traffic to the tunnel endpoint 118 by way of a tunnel 124. In so doing, the tunnel client 121 can transport the packets over a VPN tunnel that can be encrypted. The packets corresponding to the tunneled traffic are forwarded to the default gateway of the network 109 for routing to the tunnel endpoint 118, rather than directly to the services 115. Thereafter, the process can proceed to completion.

If the network traffic received at step 203 is determined not to be tunneled at step 206, the tunnel client 121 can proceed to step 212 and forward the segments of network traffic directly to the destination by way of the default gateway of the network 109 without tunneling. In some examples, the tunnel client 121 can apply prioritization to this network traffic as well, as described above with respect to steps 209 and 218, even though it is not tunneled. In this way, a low priority bulk data transfer that is not tunneled cannot interfere with a high priority video conference that is tunneled, where the network interface 129 is constrained. Alternatively, the non-tunneled network traffic can be non-prioritized. Thereafter, the process can proceed to completion.

Figure 3:
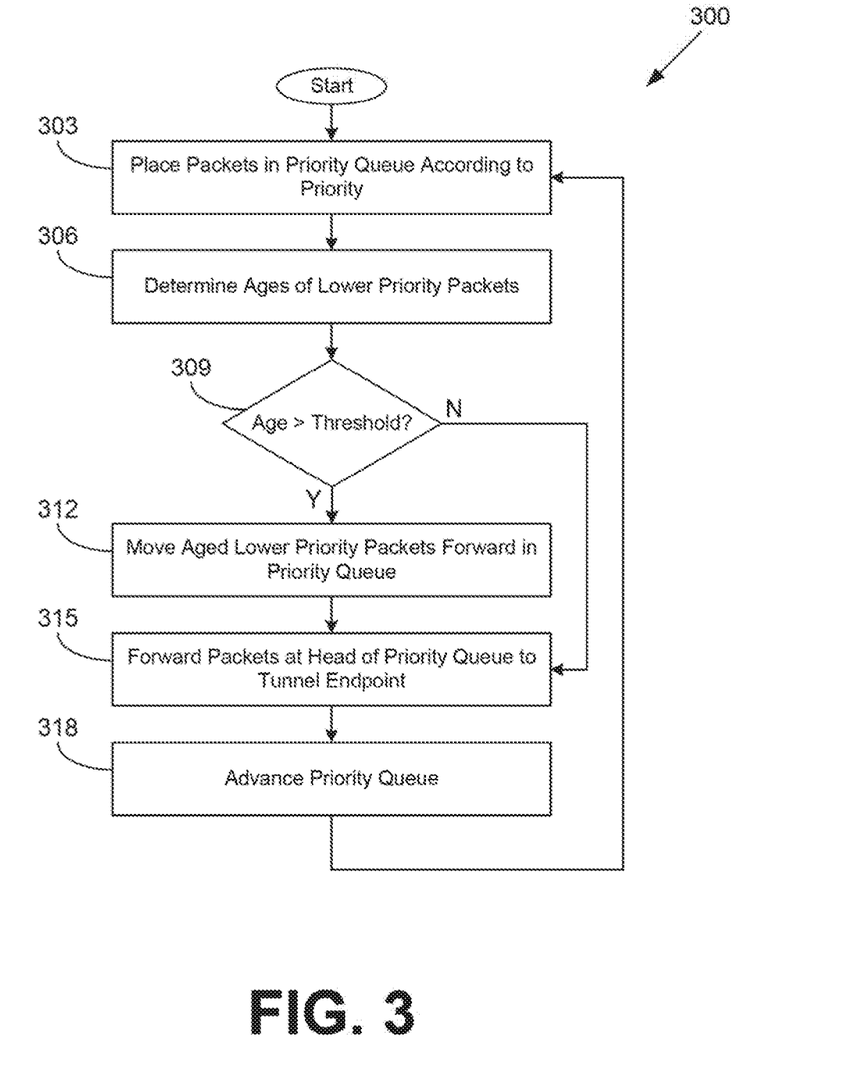

Moving on to FIG. 3, shown is a flowchart 300 that provides one example of the operation of the tunnel client 121 implementing a priority queue. Functionality attributed to the tunnel client 121 can be implemented in a single process or application or in multiple processes or applications. The separation or segmentation of functionality as discussed herein is presented for illustrative purposes only.

Beginning with step 303, the tunnel client 123 can place packets in a priority queue according to their respective assigned priorities, determined with reference to step 209 in FIG. 2. The packets associated with a high priority can be assigned to the head of the priority queue, while the packets associated with a low priority can be assigned to the tail of the priority queue.

If higher priority packets continue to arrive, usage of a priority queue can result in starvation of lower priority packet flows. That is to say, the lower priority packets will remain in the priority queue. To counteract this starvation effect, at step 306, the tunnel client 121 can determine ages of the lower priority packets in the priority queue (for example, packets having below a threshold priority). At step 309, the tunnel client 121 can determine whether the respective age of a packet, is greater than a threshold (that is, the packet has been waiting for transfer for at least a predefined length of time). If packets have ages greater than the threshold, the tunnel client 121 can continue to step 312. Otherwise, if packets have ages less than the threshold, the tunnel client 121 can continue to step 315. At step 312, the tunnel client 121 moves the packets having aged beyond the threshold forward in the priority queue (for example, to or near the head of the priority queue).

At step 315, the tunnel client 121 forwards one or more packets at the head of the priority queue to the tunnel endpoint 118 through the network 109. At step 318, the tunnel client 121 advances the priority queue. Subsequently, the process returns to step 303 and places additional received packets in the priority queue. It is noted that the flowchart, of FIG. 3 can be performed by multiple processes or threads executed concurrently.

Figure 4:
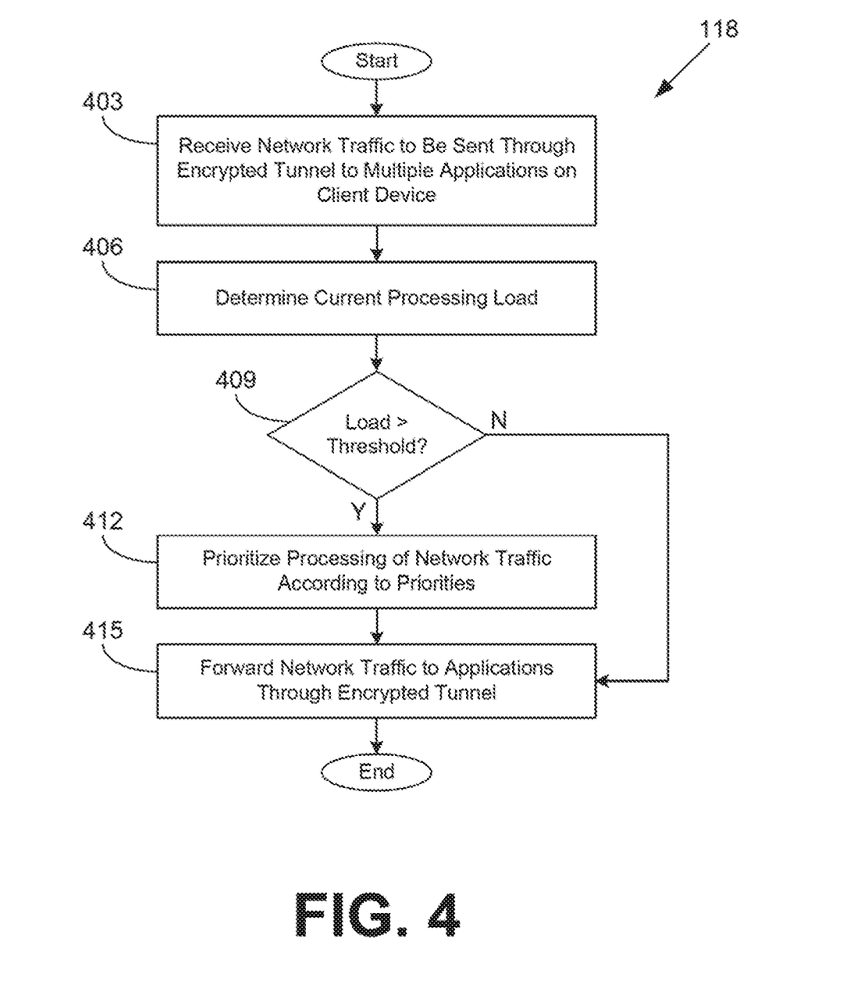

Continuing to FIG. 4, shown is a flowchart that provides one example of the operation of the tunnel endpoint 338. Functionality attributed to the tunnel endpoint 118 can be implemented in a single process or application or in multiple processes or applications. The separation or segmentation of functionality as discussed herein is presented for illustrative purposes only.

Beginning with step 403, the tunnel endpoint 118 receives network traffic from services 115 that is to be sent through an encrypted tunnel 324 to a plurality of applications 130 executed by a client device 106. For example, the network traffic can correspond to a video stream, a bulk data transfer, an email attachment, a web page, or other types of data that would be transferred to the client device 106. At step 406, the tunnel endpoint 118 determines a current processing load in the tunnel endpoint 118 related to network traffic to the client device 106. At step 409, the tunnel endpoint 118 determines whether the load meets a threshold.

If the load meets the threshold, the tunnel endpoint 118 prioritizes processing, of network traffic according to determined priorities at step 412. These priorities can be determined according to the priority rules 127, which can be similar to the priority rules 132 described in the client device 106. The prioritization can involve limiting bandwidth to lower priority traffic and/or the use of a priority queue. In some examples, multiple tunnel endpoints 118 can be utilized to provide prioritization. For example, a tunnel endpoint 118 can be sent all network traffic at a certain priority level, and the tunnel endpoint 118 can throttle the network traffic of the client device 121 according to the assigned priority level. At step 415, the tunnel endpoint 118 forwards the network traffic that has been prioritized to the applications 130 on the client device 106 by way of the encrypted tunnel 124. Thereafter, the process can proceed to completion.

If, instead, at step 409, the tunnel endpoint 118 determines that the processing load is below the threshold, the tunnel endpoint 118 can decide to forward the network traffic to the applications 130 at step 415 without undergoing prioritization. For example, the network 109 can have an unconstrained path for the tunnel 124 such that prioritization is not necessary. After forwarding the traffic, the process can proceed to completion.

Figure 5:
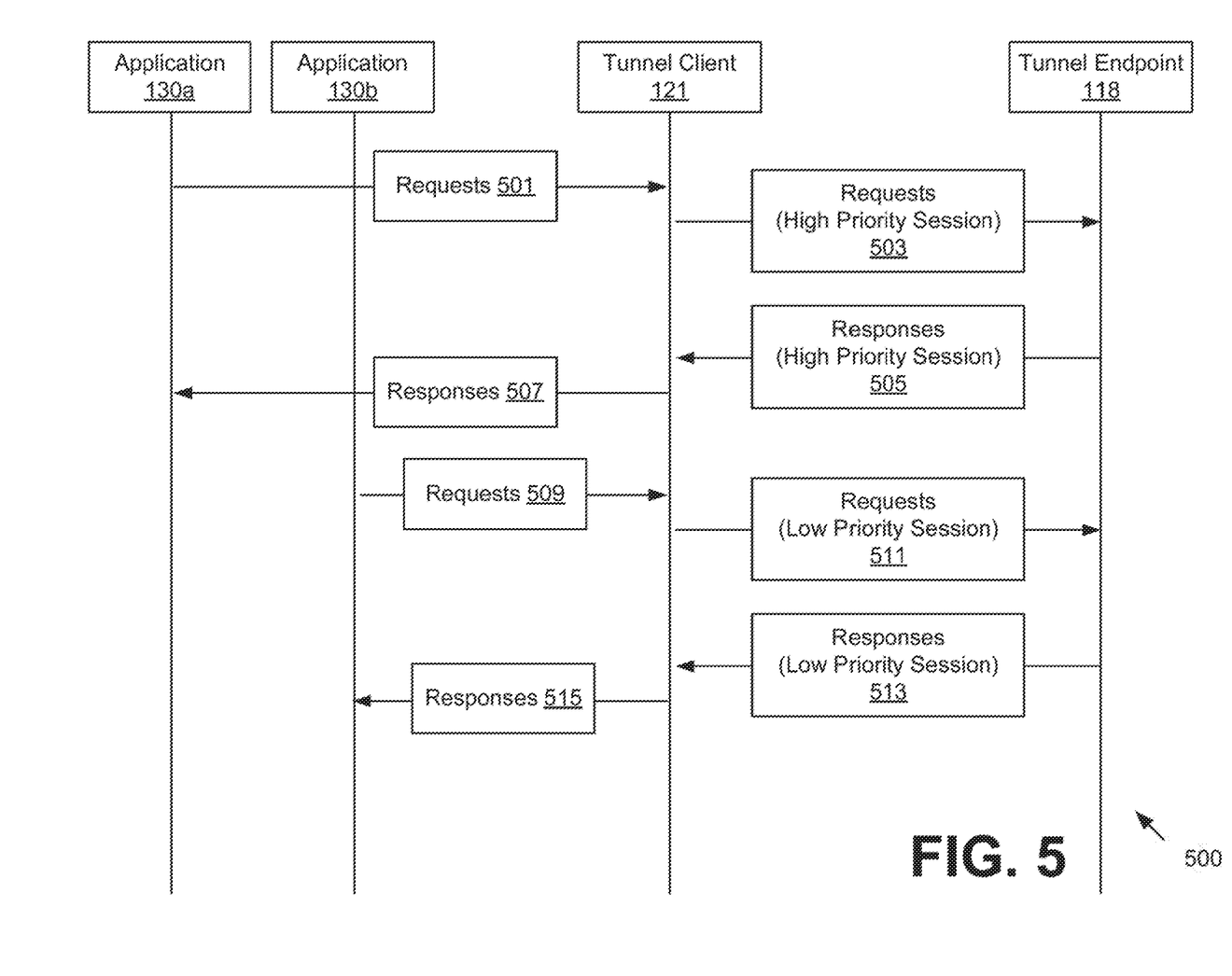
FIG. 5 is a sequence diagram illustrating example component interactions according to various examples of the present disclosure.

Moving on FIG. 5, shown is a sequence diagram 500 illustrating one example of interaction between an application 130a, an application 130b, a tunnel, client 121, and a tunnel endpoint. Functionality attributed to each of the applications 130a and 130b, the tunnel client 121, and the tunnel endpoint 118 can be implemented in fewer processes or applications or in additional processes or applications. The separation of segmentation of functionality as discussed herein is presented for illustrative purposes only.

Beginning with step 501, the application 130a sends network traffic embodying requests to a service 115a, which is routed to the tunnel client 121. At step 503, the tunnel client 121 determines that the network traffic corresponds to high priority traffic using the priority rules 132 and then forwards the requests to the tunnel endpoint 118 through a high priority tunnel session, which can have a greater relative bandwidth allocation than a lower priority tunnel session. The tunnel endpoint 118 can then forward the requests onto the service 115a, which processes the requests. The service 115a then returns responses to the tunnel endpoint 118.

At step 505, the tunnel endpoint 118 determines that the network traffic including the responses is to be given a high priority, possibly from an indicator supplied in the requests, or through application of the priority rules 127, and then sends the responses over a high priority tunnel session to the tunnel client 121. At step 507, the tunnel client 121 receives the responses over the tunnel and returns the responses to the application 130a.

At step 509, the application 130b sends network traffic embodying requests to a service 115b, which is routed to the tunnel client 121. At step 511, the tunnel client 121 determines that the network traffic corresponds to low priority traffic using the priority rules 132 and then forwards the requests to the tunnel endpoint 118 through a low priority tunnel session, which can have a lesser relative bandwidth allocation than the high priority tunnel session described above. The tunnel endpoint 118 can then forward the requests onto the service 115b, which processes the requests. The service 115b thee returns responses to the tunnel endpoint 118.

At step 513, the tunnel endpoint 118 determines that the network traffic including the responses is to be given a low priority, possibly from an indicator supplied in the requests, or through application of the priority rules 127, and then sends the responses over a low priority tunnel session to the tunnel client 121. At step 515, the tunnel client 121 receives the responses over the tunnel and returns the responses to the application 130b.

Although a single tunnel endpoint 118 is depicted in FIG. 5, multiple tunnel endpoints 118 can be used in other examples. For instance, requests for a high priority session can be forwarded to a first tunnel endpoint 118 over a first encrypted tunnel 124, while requests for a low priority session can be forwarded to a second tunnel endpoint 118 over a second encrypted tunnel 124.

The flowcharts of FIGS. 2-4 and the sequence diagram of FIG. 5 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The computing environment 103 and the client devices 106 or other components described herein can include at least one processing circuit. Such a processing circuit can include, for example, one or more processors and one of more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the applications 130, the services 115, the tunnel client 121, the tunnel endpoint 118, and/or other components can be stored in one or more storage devices and be executable by one or more processors. Also, a data store can be stored in the one or more storage devices.

The applications 130, the services 115, the tunnel client 121, the tunnel endpoint 118, and or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

What is claimed is:

1. A non-transitory computer-readable medium embodying at least one program executable in a client device, the at least one program, when executed by the client device, being configured to cause the client device to at least:
  receive network traffic from each of a plurality of applications executed by the client device;
  determine that the network traffic for each of the plurality of applications is to be forwarded through a single encrypted tunnel to a tunnel endpoint;
  determine, by applying a priority rule configured on the client device, that the network traffic of a first application of the plurality of applications is associated with a lower priority than the network traffic of a second application of the plurality of applications;
  limit, by the client device, a bandwidth allocation to the network traffic of the first application in the single encrypted tunnel as compared to a bandwidth allocation to the network traffic of the second application in the single encrypted tunnel according to the lower priority; and
  forward the network traffic of each of the plurality of applications through the single encrypted tunnel to the tunnel endpoint.

2. The non-transitory computer-readable medium of claim 1, wherein when executed the at least one program further causes the client device to at least:
  determine an available bandwidth over a network between the client device and the tunnel endpoint; and
  determine the bandwidth allocations based at least in part on the available bandwidth.

3. The non-transitory computer-readable medium of claim 1, wherein when executed the at least one program further causes the client device to at least:
  receive network traffic from a third application executed in the client device; and
  determine that the network traffic for the third application is not to be forwarded through the single encrypted tunnel to the tunnel endpoint; and
  forward the network traffic for the third application to a default network gateway for the client device.

4. The non-transitory computer-readable medium of claim 1, wherein when executed the at least one program further causes the client device to at least determine that the network traffic of the first application is associated with the lower priority than the network traffic of the second application in response to determining that the first application is currently a background application in the client device and that the second application is currently a foreground application in the client device.

5. The non-transitory computer-readable medium of claim 1, wherein the priority rule designates the first application as a lower priority application than the second application.

6. The non-transitory computer-readable medium of claim 1, wherein when executed the at least one program further causes the client device to at least:
  determine that the network traffic of the first application corresponds to a first network protocol;
  determine that the network traffic of the second application corresponds to a second network protocol; and
  wherein the priority rule designates the first network protocol as a lower priority network protocol than the second network protocol.

7. The non-transitory computer-readable medium of claim 1, wherein when executed the at least one program further causes the client device to at least:
  determine that the network traffic of the first application is to a first network destination;
  determine that the network traffic of the second application is to a second network destination; and
  wherein the priority rule designates the first network destination as a lower priority destination than the second network destination.

8. A system, comprising:
  a client device comprising a processor and a memory; and
  a networking subsystem executable by the client device, the networking subsystem configured to cause the client device to at least:
    receive network traffic from each of a plurality of applications executed by the client device;
    determine that the network traffic for each of the plurality of applications is to be forwarded through a single encrypted tunnel to a tunnel endpoint;
    determine, by applying a priority rule configured on the client device, that a first segment of the network traffic of a first application of the plurality of applications is associated with a lower priority than a second segment the network traffic of a second application of the plurality of applications;
    prioritize, by the client device, the first segment of the network traffic of the first application in the single encrypted tunnel under the second segment of the network traffic of the second application in the single encrypted tunnel according to the lower priority; and
    forward the network traffic of each of the plurality of applications through the single encrypted tunnel to the tunnel endpoint.

9. The system of claim 8, wherein the networking subsystem prioritizes the first segment of the network traffic of the first application in the single encrypted tunnel under the second segment of the network traffic of the second application in the single encrypted tunnel using a priority queue.

10. The system of claim 9, wherein the priority queue is configured to move a lower priority data packet associated with the lower priority to a front of the priority queue if the lower priority data packet has not been processed within a predefined amount of time.

11. The system of claim 8, wherein the networking subsystem prioritizes the first segment of the network traffic of the first application in the single encrypted tunnel under the network traffic of the second application in the single encrypted tunnel by limiting a bandwidth allocation to the first segment of the network traffic of the first application.

12. The system of claim 8, wherein the lower priority is determined based at least in part on a first destination associated with the first segment of the network traffic of the first application and a second destination associated with the second segment of the network traffic of the second application.

13. The system of claim 8, wherein the lower priority is determined based at least in part on a first network protocol associated with the first segment of the network traffic of the first application and a second network protocol associated with the second segment of the network traffic of the second application.

14. A computer-implemented method for prioritizing network traffic in single encrypted tunnel, comprising:

receiving the network traffic to be sent through the single encrypted tunnel to a plurality of applications executed in a client device;

determining, by applying a priority rule configured on the client device, that the network traffic of a first application of the plurality of applications is associated with a lower priority than the network traffic of a second application of the plurality of applications;

prioritizing, by the client device, processing of the network traffic of the first application in the under processing of the network traffic of the second application according to the lower priority; and forwarding the network traffic of each of the plurality of applications through the single encrypted tunnel to the client device.

15. The computer-implemented method of claim 14, further comprising deferring processing of the network traffic of the first application based at least in part on a current processing load.

16. The computer-implemented method of claim 14, wherein the priority rule designates the first application as being a lower priority application relative to the second application.

17. The computer-implemented method of claim 14, further comprising:

determining a first domain corresponding to the network traffic of the first application;

determining a second domain corresponding to the network traffic of the second application; and wherein the priority rule designates the first domain as being a lower priority domain relative to the second domain.

18. The computer-implemented method of claim 14, further comprising:

determining a first network protocol corresponding to the network traffic of the first application;

determining a second network protocol corresponding to the network traffic of the second application; and wherein the priority rules designates the first network protocol as being a lower priority network protocol relative to the second network protocol.

19. The computer-implemented method of claim 14, further comprising:

determining a first priority level for the network traffic of the first application specified by the client device;

determining a second priority level for the network traffic of the second application specified by the client device; and wherein determining that the network traffic of the first application is associated with the lower priority than the network traffic of the second application is based at least in part on a comparison of the first priority level to the second priority level.

20. The system of claim 8, wherein the priority rule indicates that a background application in the client device is given a lower priority than a foreground application the client device.

* * * * *